USU07467775B2

(12) United States Patent
Lu et al.

(10) Patent No.: US 7,467,775 B2
(45) Date of Patent: Dec. 23, 2008

(54) FASTENING APPARATUS AND HOLDING RACK

(75) Inventors: Kun-Yen Lu, Taipei (TW); Ming-Chih Chuang, Taipei (TW)

(73) Assignee: Kinpo Electronics, Inc., Taipei County (TW)

( * ) Notice: Subject to any disclaimer, the term of this patent is extended or adjusted under 35 U.S.C. 154(b) by 6 days.

(21) Appl. No.: 11/610,708

(22) Filed: Dec. 14, 2006

(65) Prior Publication Data

US 2008/0142675 A1 Jun. 19, 2008

(51) Int. Cl.
*F16M 13/00* (2006.01)
(52) U.S. Cl. .................. 248/663; 248/288.51; 248/676; 248/917
(58) Field of Classification Search .................. 248/663, 248/181.1, 288.31, 288.51, 481, 484, 676, 248/917, 919, 922, 923; 403/76, 77, 90, 403/114, 122, 124–127, 141–143; 108/1, 108/4
See application file for complete search history.

(56) References Cited

U.S. PATENT DOCUMENTS

| | | | | |
|---|---|---|---|---|
| 2,433,594 A | * | 12/1947 | Calo | ........................ 84/421 |
| 4,040,650 A | * | 8/1977 | Shotbolt | ........................ 285/18 |
| 5,103,384 A | * | 4/1992 | Drohan | ........................ 362/191 |
| 5,845,885 A | * | 12/1998 | Carnevali | ................. 248/181.1 |

* cited by examiner

*Primary Examiner*—Korie H. Chan
(74) *Attorney, Agent, or Firm*—Jianq Chyun IP Office (57) ABSTRACT

A fastening holding rack includes a holding dock, a holding device and a fastening apparatus. The holding device has a holding bracket and a fastened member. The fastening apparatus includes a collet and a sleeve. The collet has a bottom and a plurality of jutting plates. The collet is mounted onto the holding dock to hold the fastened member. The jutting plates are located longitudinally on the bottom in a protrusive manner. Each of the jutting plates has an outer surface on which a portion is extended outwards greater than another portion. The collet is encased in the sleeve. The sleeve has a tubular wall which has a plurality of segments corresponding to the jutting plates. Each segment has an inner surface on which a portion is extended inwards greater than another portion. When the greater extended inward portion of the tubular wall is in contact with the greater extended outwards portion of the jutting plate, the jutting plate is tilted inwards to press the fastened member.

14 Claims, 8 Drawing Sheets

FASTENING APPARATUS AND HOLDING RACK

BACKGROUND OF THE INVENTION

1. Field of the Invention

The present invention relates to a fastening apparatus and particularly to a fastening apparatus adopted for use on a holding rack.

2. Description of the Prior Art

With the constant advance of information technology, personal handheld electronic devices such as PDAs, handsets, GPS and digital video/audio players have become increasingly popular. When the handheld electronic devices are in a standby, or OFF, condition, they often are placed randomly by some users. As a result the users often cannot find them when they are needed. To remedy this problem, holding racks have been developed to hold the handheld electronic devices when they are in the standby, or OFF, condition so that they can be readily found whenever needed.

Figure 1:
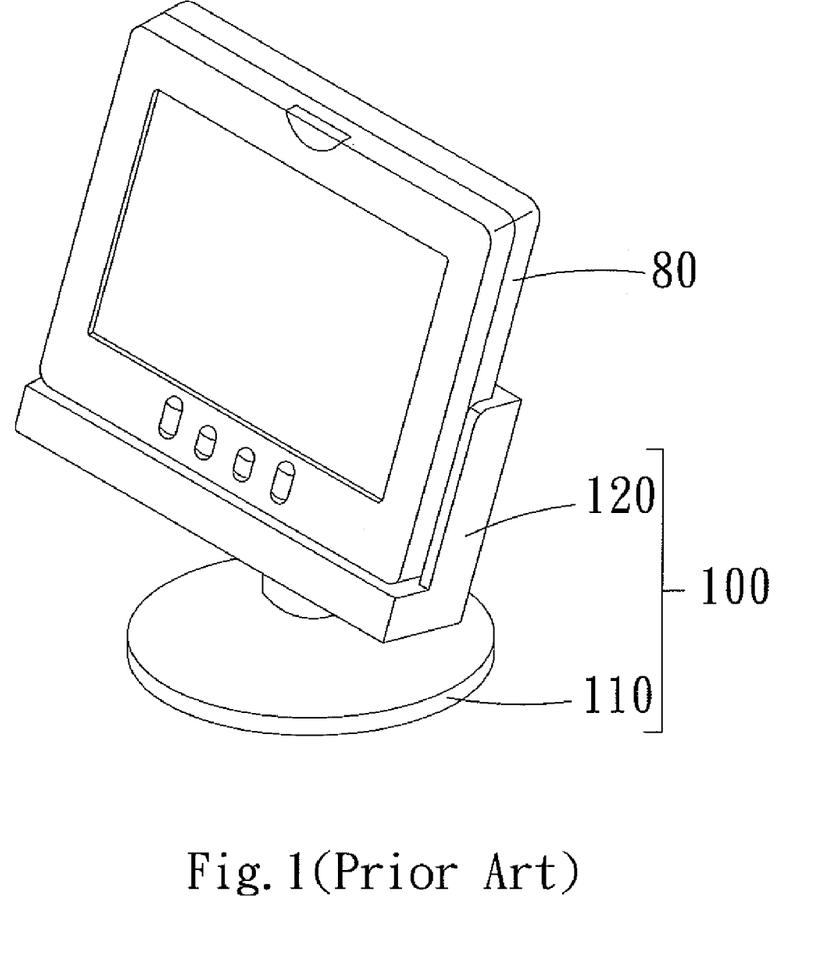
FIG. 1 is a schematic view of a conventional holding rack for holding a portable video/audio player.

There are many types of holding racks now available on the market to hold handheld electronic devices. FIG. 1 illustrates one kind of holding rack that aims to hold a portable video/audio player 80. The holding rack 100 mainly includes a holding bracket 120 to hold the video/audio player 80 and a holding dock 110. The holding bracket 120 and the holding dock 110 are coupled together in an integrated manner.

However, as the handheld electronic devices now on the market are made in a wide variety of styles, even devices from the same brand have different shapes and sizes in different models. The holding bracket 120 also has to be formed in different shapes and sizes accordingly. With the holding bracket 120 and the holding dock 110 coupled in an integrated manner, once the holding bracket 120 is replaced, the holding dock 110 also has to be replaced. This is not economically effective.

To resolve the aforesaid problem, another approach has been adopted that forms the holding bracket and the holding dock separately, which are then assembled to become a holding rack as desired. Such an approach makes the holding dock reusable when the holding bracket is replaced. It also makes mass production of the holding bracket and holding dock easier. At present, the holding bracket and holding dock are mostly fastened by screws to form the holding rack. Fastening by screws takes more time and effort, whether in fabrication and assembly, or during replacement of the holding bracket by users. There is still room for improvement.

SUMMARY OF THE INVENTION

In view of the aforesaid problems, the present invention aims to provide a fastening apparatus to facilitate assembly or replacement of the holding bracket.

The primary object of the invention is to provide a holding rack that has a fastening apparatus to reduce assembly and replacement time of a holding bracket and also to make assembly and replacement operations easier.

Another object of the invention is to provide a fastening apparatus to reduce assembly and replacement time of a holding bracket and also to make assembly and replacement operations easier.

To achieve the foregoing objects, the holding rack, according to the invention, includes a holding dock, a holding device and a fastening apparatus. The holding device includes a holding bracket and a fastened member. The fastening apparatus includes a collet and a sleeve. The collet is mounted onto the holding dock to hold the fastened member. The collet includes a bottom and a plurality of jutting plates located longitudinally on the bottom and extended outwards. Each of the jutting plates has an outer surface on which a portion is extended outwards greater than another portion. The collet is encased by the sleeve which has a tubular wall formed with a plurality of segments corresponding to the jutting plates. Each segment has an inner surface on which a portion is extended inwards greater than another portion. The greater extended inwards portion of the tubular wall can be in contact with the greater extended outwards portion of the jutting plates such that the jutting plates are urged inwards in an inclined manner to compress the fastened member.

The fastening apparatus, according to the invention, is located on an object capable of being fastened to an assembly article. The assembly article includes a fastened member. The fastening apparatus includes a collet and a sleeve. The collet is mounted onto a holding dock to hold the fastened member. The collet includes a bottom and a plurality of jutting plates located on the bottom and extended longitudinally. Each jutting plate has an outer surface on which a portion is extended outwards greater than another portion. The collet is encased by the sleeve which has a tubular wall formed with a plurality of segments corresponding to the jutting plates. Each segment has an inner surface on which a portion is extended inwards greater than another portion. The greater extended inwards portion of the tubular wall can be in contact with the greater extended outwards portion of the jutting plates such that the jutting plates are urged inwards in an inclined manner to compress the fastened member.

In the fastening apparatus, there is a first boss disposed on the inner surface of each jutting plate.

In the fastening apparatus, the inner surface of the tubular wall has a second boss on the segment that is extended greater, and the outer surface of the jutting plate has at least a portion extended gradually outwards in the counterclockwise or clockwise direction. The second boss and the jutting plate have, respectively, a convex brink and a concave brink, or a concave brink and a convex brink that are engaged with each other. In addition, the inner surface of the tubular wall other than the segment where the second boss is located has an inner surface on each segment tat is extended inwards gradually in the counterclockwise or clockwise direction.

In the fastening apparatus, the second boss may be located on the outer surface of the jutting plate. The inner surface of each segment of the tubular wall has at least a portion extended gradually inwards in the clockwise or counterclockwise direction.

In the fastening apparatus, when the segment on the inner surface of the tubular wall that is extended greatest is positioned in a gap formed between the jutting plates, the inner surface of the tubular wall is in contact with the outer surface of the jutting plate.

In the holding rack or fastening apparatus set forth above, the sleeve further has at least one push member located outside the tubular wall.

In the holding rack or fastening apparatus set forth above, the holding device or other assembly articles may be assembled and disassembled by rotating the sleeve. Hence, the fastening apparatus of the invention is easier to assemble.

The foregoing, as well as additional objects, features and advantages of the invention will be more readily apparent from the following detailed description, which proceeds with reference to the accompanying drawings. The embodiments depicted below serve only for illustrative purposes and are not the limitation of the invention. The scope of the invention is limited only by the claims listed hereinafter.

DESCRIPTION OF THE PREFERRED EMBODIMENTS

Figure 2:
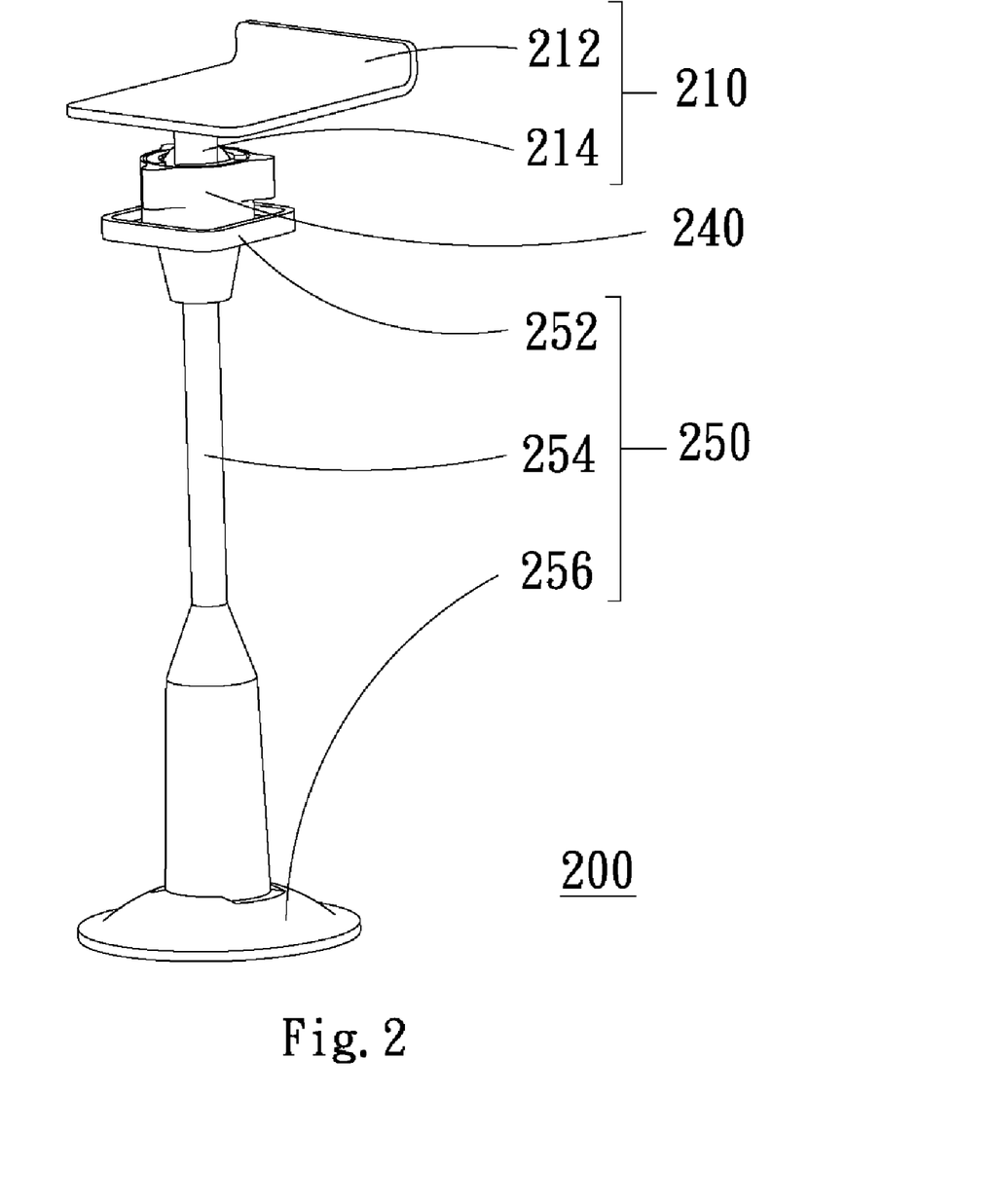
FIG. 2 is a schematic view of a first embodiment of the holding rack of the invention.
Figure 3:
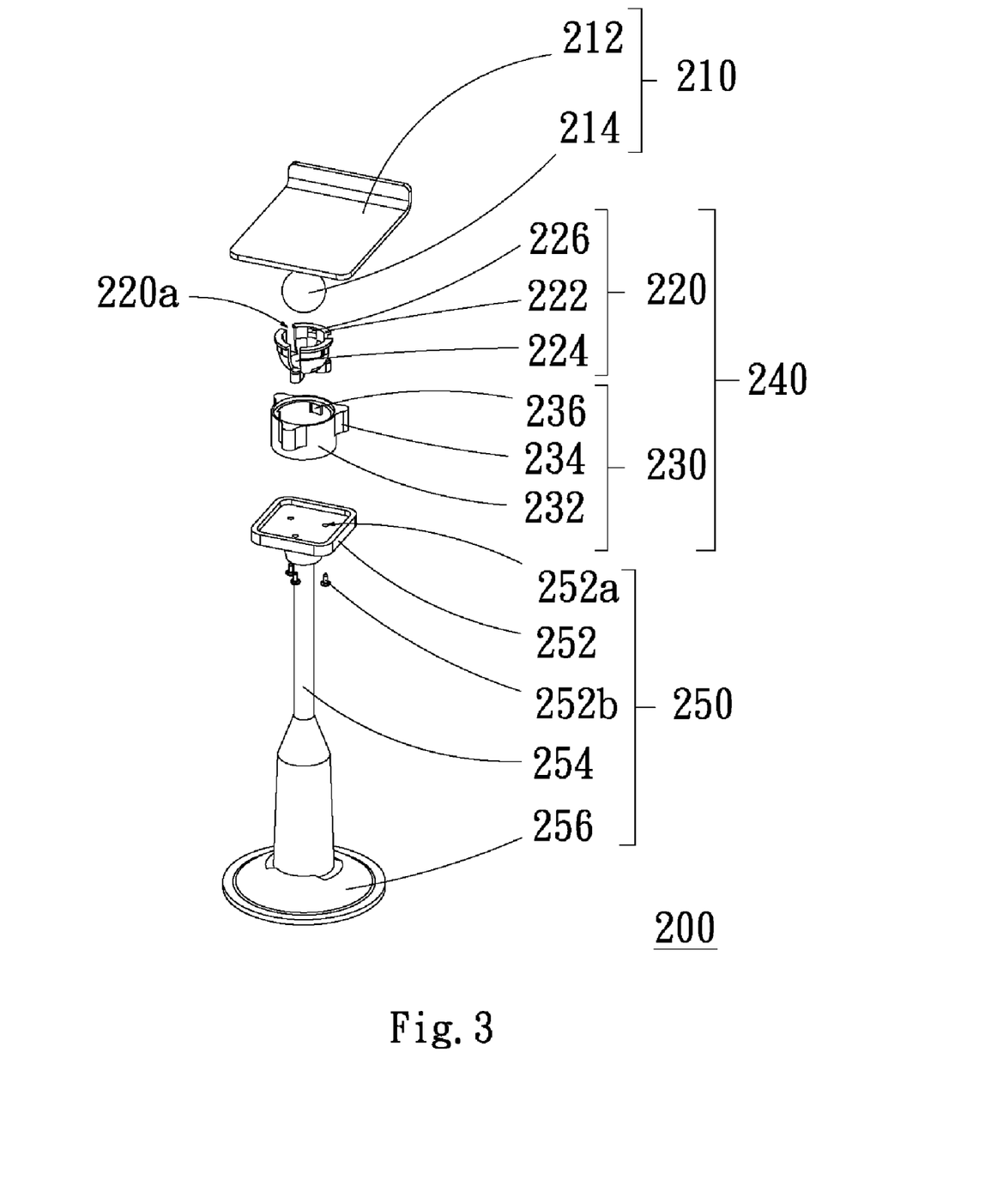
FIG. 3 is an exploded view of the invention according to FIG. 2.

Refer to FIGS. 2 and 3 for a first embodiment of the holding rack of the invention. The holding rack 200 includes a holding device 210, a fastening apparatus 240 and a holding dock 250. The holding device 210 has a holding bracket 212 and a fastened member 214 which is extended on a lower side of the holding bracket 212. The fastening apparatus 240 includes a collet 220 and a sleeve 230. The fastened member 214 is held in the collet 220 which is encased in the sleeve 230. The sleeve 230 has a tubular wall 232 with push members 234 on the outer side to drive the sleeve 230. In this embodiment, three sets of the push members 234 are provided. However, the number of the push members 234 may also be one, two or four or more.

The collet 220 includes a plurality of jutting plates 222 (three sets are shown in FIG. 3) and a bottom 224. The jutting plates 222 are located longitudinally on the bottom 224 in a protrusive manner. The tubular wall 232 has a plurality of segments (three segments are formed in this embodiment). Each of the segments corresponds to one jutting plate 222. Each segment has an inner surface on which a portion is extended inwards greater than another portion. In this embodiment, the extended portion is a second boss 236. The holding dock 250 includes a top tray 252, a post 254 and a base 256. The post 254 is mounted onto the base 256. The top tray 252 is mounted onto the post 254.

For assembling the holding rack, screws 252b run through apertures 252a formed on the top tray 252 to be fastened to screw holes (not shown in the drawings) of the collet 220 to fasten the collet 220 to the holding dock 250. The collet 220 is then encased in the sleeve 230, with the second boss 236 aligning with a gap 220a formed between the jutting plates 222. After the sleeve 230 is coupled, the second boss 236 is positioned in the gap 220a of the jutting plates 222. The collet 220 is in an unfastening condition at this time. The fastened member 214 may be then placed in the collet 220 (details of assembly operation will be discussed below).

Aside from fastening by screws, the collet 220 may also be fastened to the holding dock 250 through other ways such as tenons, suction trays, magnets and the like. Moreover, the base 256 may be an ordinary flat deck or with a suction tray located on the bottom thereof.

Figure 4:
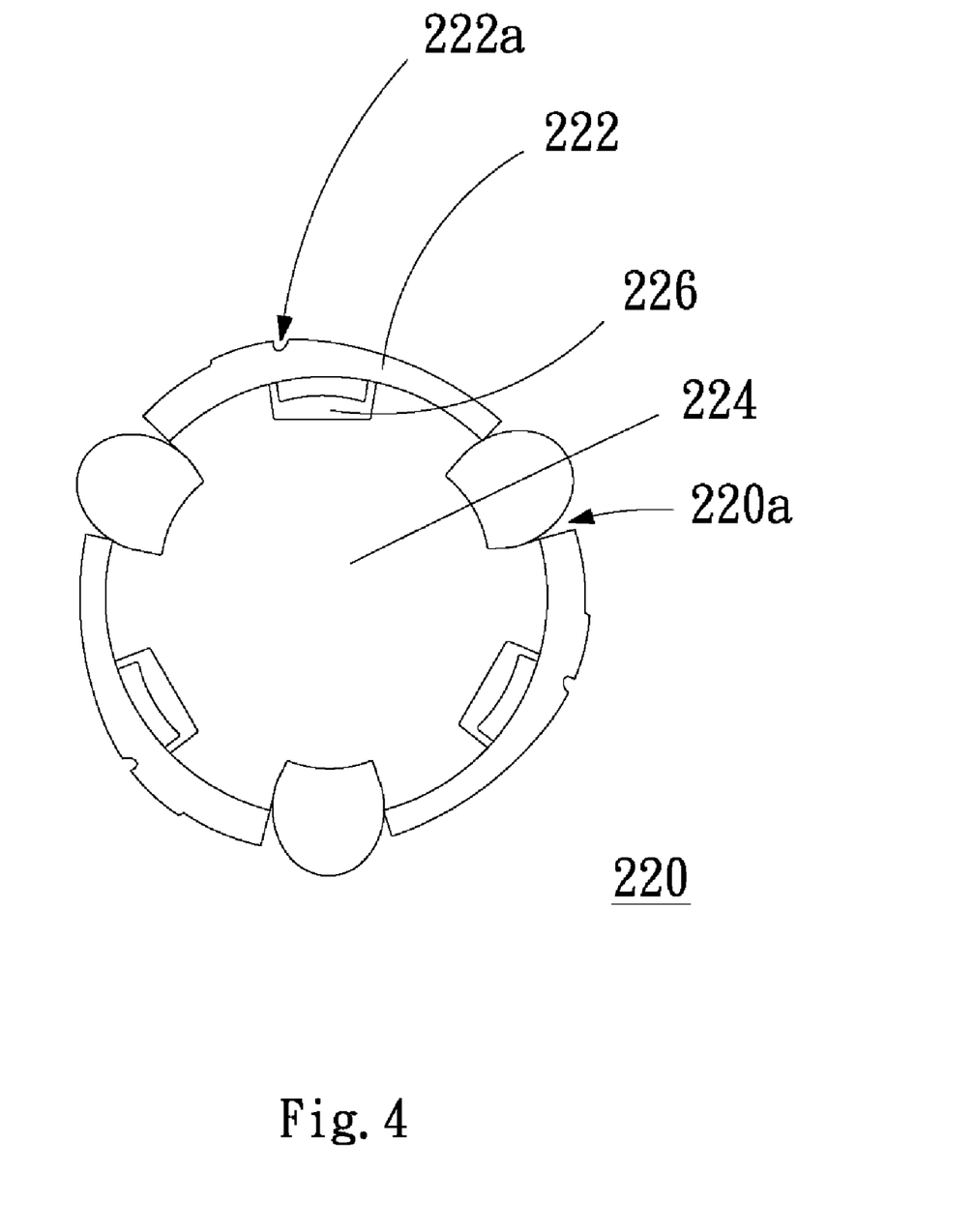
FIG. 4 is a top view of the collet according to FIG. 3.

Referring to FIG. 4, the jutting plate 222 has a portion extended outwards greater than other portion. For instance in FIG. 4, at least one portion of the jutting plate 222 has the outer surface extended gradually outwards in the counterclockwise direction. Of course, the outer surface of the jutting plate 222 may also be extended gradually outwards in the clockwise direction.

The following depicts operation of the fastening apparatus 240 to enable those skilled in the art to assemble and disassemble the holding device 210 through the fastening apparatus 240. The operating method of the fastening apparatus 240 will be described with reference to FIGS. 5A, 5B, 6A and 6B.

Figure 5A:
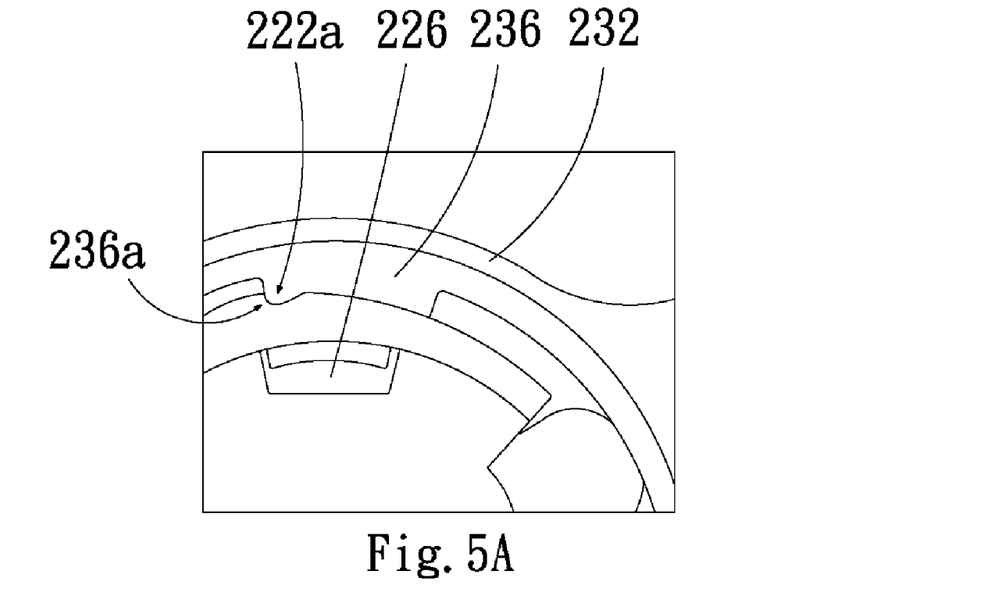
FIG. 5A is a schematic view of the fastening apparatus in a fastening condition showing the positional relationship of the jutting plate and one segment of the tubular wall.
Figure 6A:
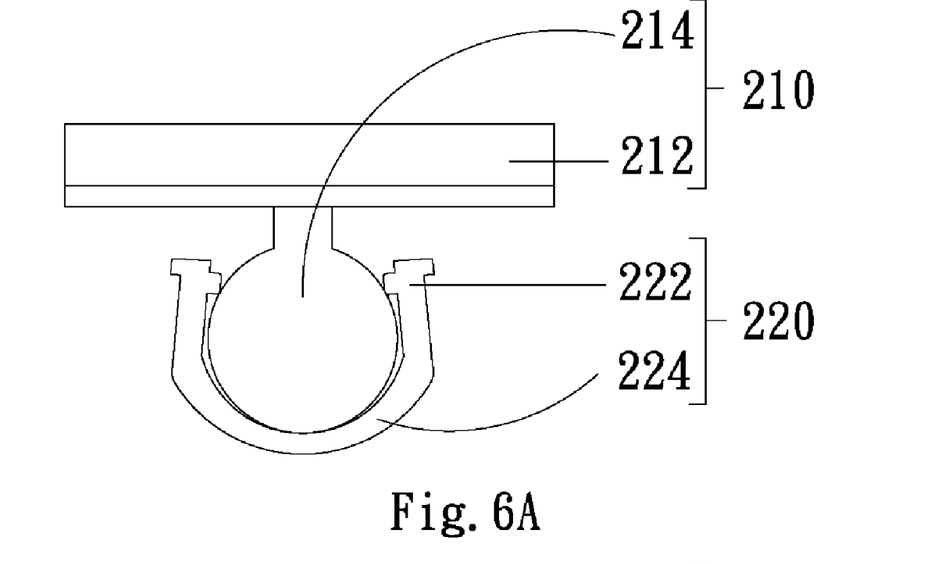
FIG. 6A is a schematic view of the fastening apparatus in a fastening condition showing the positional relationship of the collet and the fastened member.
Figure 6B:
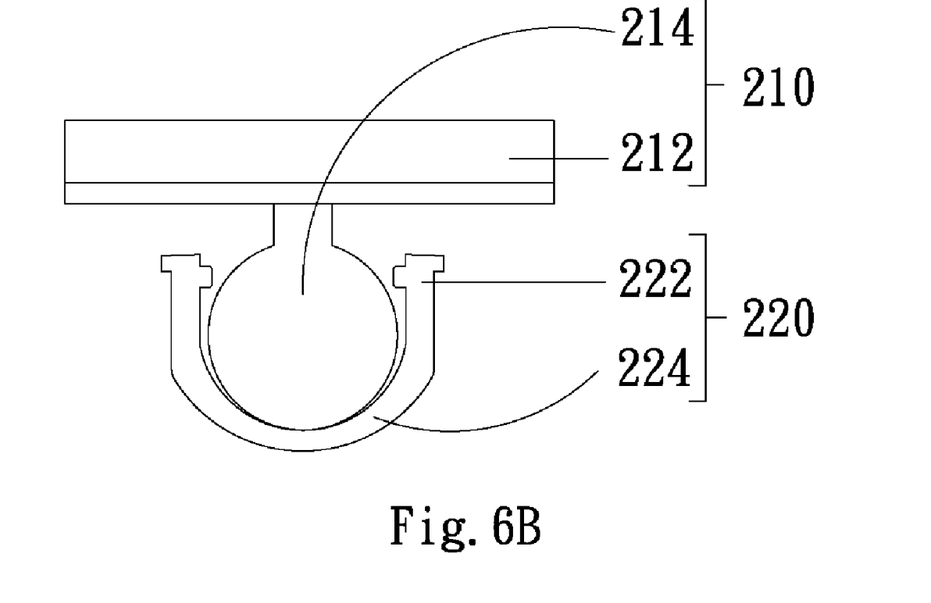
FIG. 6B is a schematic view of the fastening apparatus in an unfastening condition showing the positional relationship of the collet and the fastened member.

First, referring to FIGS. 5A and 6A, when the holding device 210 has been installed on the holding rack, the push members 234 outside the sleeve 230 may be pushed to rotate the sleeve 230 in the counterclockwise direction. The second boss 236 originally located in the gap 220a is moved on the outer surface of the jutting plate 222 and is in contact with the greater extended outwards portion thereof. Due to pressing of the second boss 236, the jutting plate 222 is tilted inwards. As a result, the fastened member 214 is pressed by a first boss 226 and the inner surface of the jutting plate 222. Therefore, the holding device 210 cannot be easily removed from the collet 220. The holding device 210 is securely held by the fastening apparatus 240.

To remove the holding device 210 from the holding rack 200, the push members 234 (as shown in FIG. 3) are pushed to rotate the sleeve 230 in the clockwise direction (if the outer surface of the jutting plate 222 is gradually extended outwards in the clockwise direction, the sleeve 230 must be rotated in the counterclockwise direction). As the outer surface of the jutting plate 222 is gradually extended outwards in the counterclockwise direction, the pressing force received by the jutting plate 222 from the sleeve 230 decreases gradually. When the second boss 236 of the sleeve 230 is located between two jutting plates 222 without being in contact with any one of them, the fastened member 214 does not receive the first boss 226 and the inner surface of the jutting plate 222. Hence, the holding device 210 can be easily removed from the holding rack 200.

During installation of the holding device 210, users can determine the fastening condition of the fastening apparatus 240 by touching it with the hand. Moreover, the second boss 236 and the jutting plate 222 may also have, respectively, a convex brink 236a and a concave brink 222a that are engaged with each other. During fastening of the fastening apparatus 2401 the convex brink 236a is engaged with the concave brink 222a. Then, a clicking sound and vibration are generated to inform users that the holding device 210 has been securely coupled with the holding rack 200. In addition, the mating convex brink 236a and the concave brink 222a also enable the collet 220 and the sleeve 230 to form a more secured coupling without it loosening easily. Of course, to those skilled in the art, the convex brink may also be formed on the jutting plate 222 while the concave brink is formed on the second boss 236.

In the previous discussion, the first boss 226 on the inner surface of the jutting plate 222 mainly allows the fastened member 214 to be fastened more securely in the collet 220. Of course, to those skilled in the art, the first boss 226 may be dispensed with. Through the inner surface of the jutting plate 222, a pressing force may be generated to fasten the fastened member 214 in the collet 220.

While the second boss 236 previously discussed is located on the tubular wall 232, in practice, it also may be located on the outer surface of the jutting plate 222, and at least a portion of the inner surface of the tubular wall 232 is extended gradually inwards in the clockwise or counterclockwise direction. This design can also achieve similar hash results to the first embodiment.

More embodiments of the invention are discussed below. The same elements as the first embodiment are marked by the same numerals, and will not be discussed unless necessary.

Figure 7:
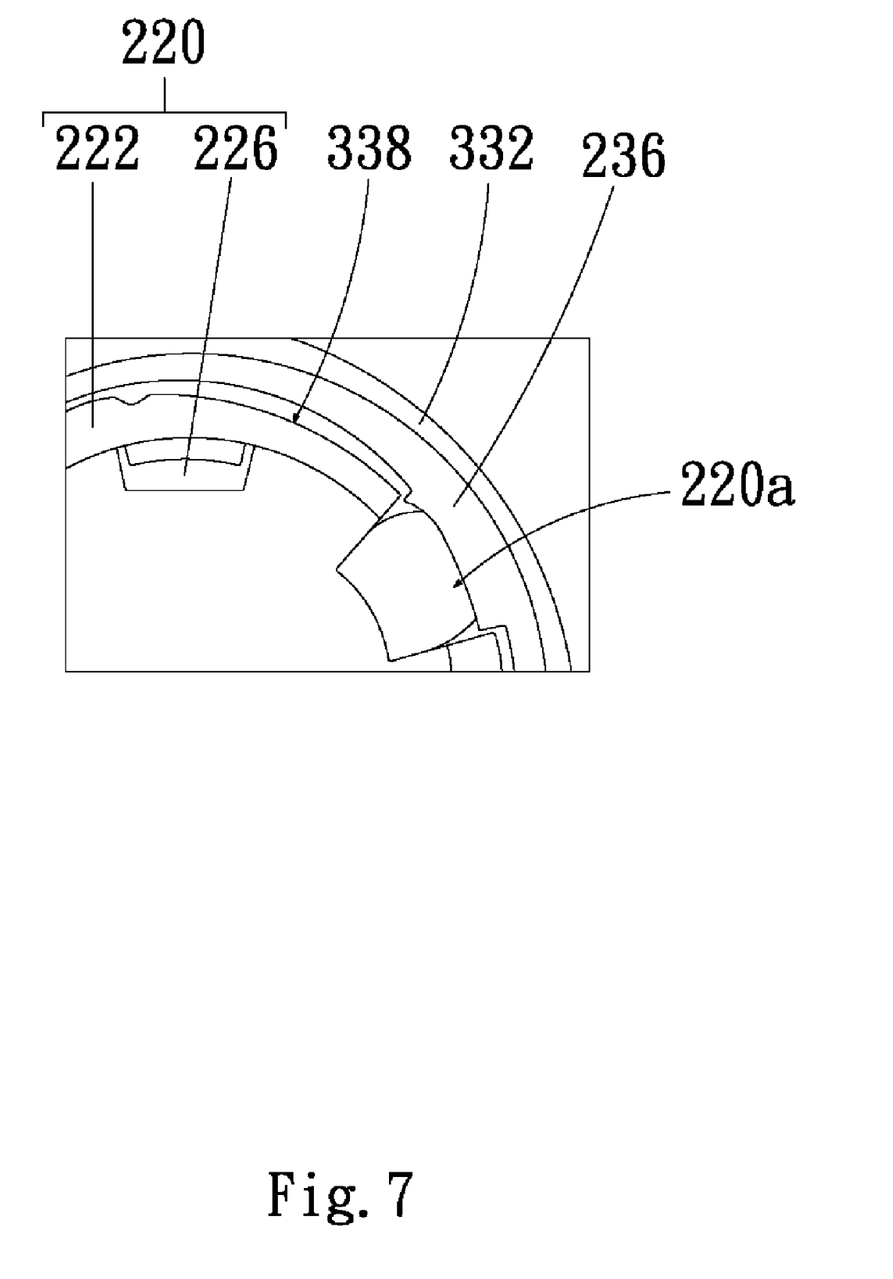
FIG. 7 is a schematic view of a second embodiment of the fastening apparatus in an unfastening condition showing the positional relationship of the jutting plate and one segment of the tubular wall.

Referring to FIG. 7, a second embodiment of the invention has the fastening apparatus in an unfastening condition. In this embodiment, aside from the portion where the second boss 236 is located, the inner surface of the tubular wall 332 is gradually extended inwards in the counterclockwise or clockwise direction (clockwise direction is shown in FIG. 7).

Figure 5B:
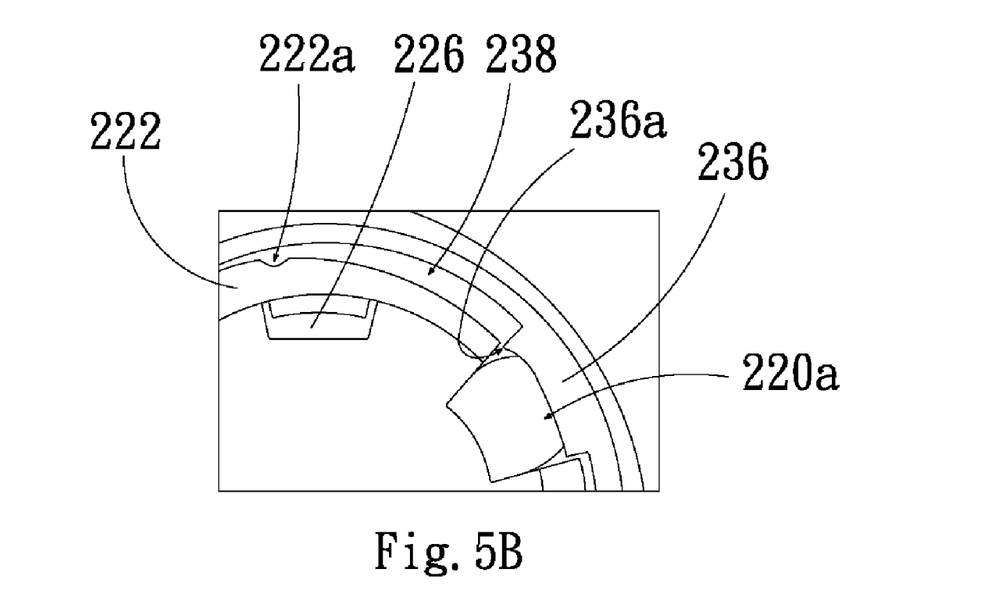
FIG. 5B is a schematic view of the fastening apparatus in an unfastening condition showing the positional relationship of the jutting plate and one segment of the tubular wall.

In comparing FIG. 7 with FIG. 5B, the gap 338 between the jutting plate 222 and the tubular wall 332 in FIG. 7 is smaller than the gap 238 between the jutting plate 222 and the tubular wall 232 in FIG. 5B. Hence, in the second embodiment, when the fastening apparatus 240 is in the unfastening condition, the collet 220 is less likely to sway.

Of course, having the second boss 236 on the tubular wall 232 is not the only way to enable the fastening apparatus 240 to form the fastening effect. In practice, the same effect can be achieved as long as there is an extended portion on the inner surface of the tubular wall 232 in contact with the extended portion on the outer surface of the jutting plate 222 that can push the jutting plate 222 inwards to press the fastened member 214 to generate a tensile force.

Figure 8A:
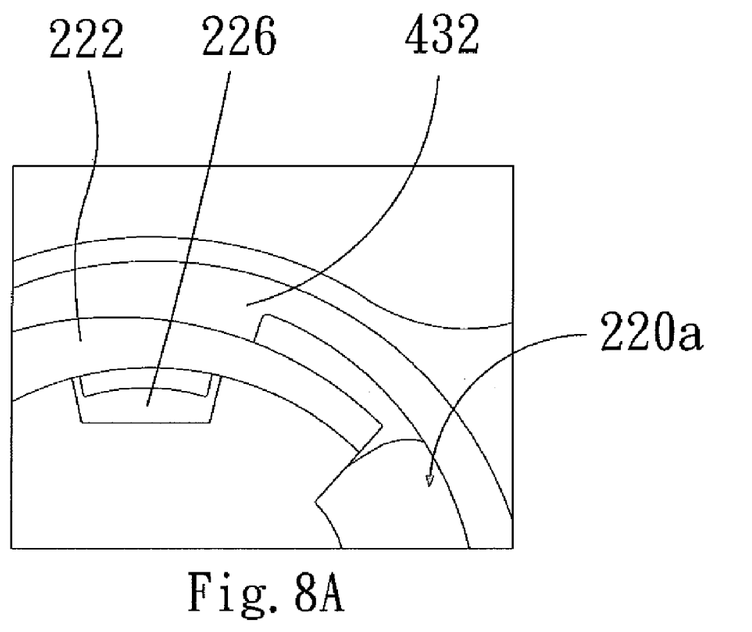
FIG. 8A is a schematic view of a third embodiment of the invention showing the fastening apparatus in a fastening condition and the positional relationship of the jutting plate and one segment of the tubular wall.
Figure 8B:
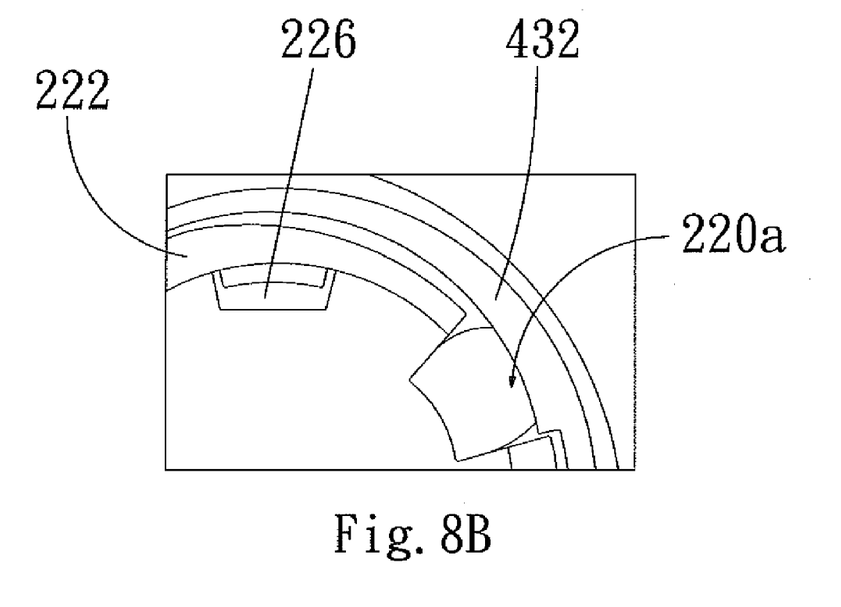
FIG. 8B is a schematic view of the third embodiment of the invention showing the fastening apparatus in a unfastening condition and the positional relationship of the jutting plate and one segment of the tubular wall.

Referring to FIGS. 8A and 8B, a third embodiment of the invention depicts the fastening apparatus in fastening and unfastening conditions.

Compared with the tubular wall 232 of the first embodiment (referring to FIGS. SA and SB), the tubular wall 432 in this embodiment differs by not having a boss on the inner surface thereof. The inner surface of each segment is extended gradually inwards in the clockwise direction.

Referring to FIG. 8A, when the fastening apparatus 240 is in the fastening condition, the greater extended portion of the inner surface of the tubular wall 432 is in contact with the greater extended portion of the outer surface of the jutting plate 222. Referring to FIG. 8B, when the fastening apparatus 240 is in the unfastening condition, the most extended portion on the inner surface of the tubular wall 432 is located in the gap 220a.

Moreover, in the embodiments set forth above, the fastening apparatus 240 aims to fasten the holding device 210. In practice, it also can be used to fasten other assembly articles such as a charge socket of handsets, statues or other ornamental articles as long as the assembly articles have a fastened member 214 to be fastened by the fastening apparatus 240.

In addition, it is not necessary for the fastening apparatus 240 to be mounted onto the holding dock 250. It can also be fastened to other objects through screws or a suction tray such as on a wall or in the interior of vehicles.

Furthermore, the fastened member may be an ellipsoidal or conical object or other shapes as long as it can be pressed by the collet 220 to generate a tensile force when the fastening apparatus is in the fastening condition.

In short, by the present invention, users can merely rotate the sleeve to assemble and disassemble the holding device or other assembly articles. Moreover, the convex brink and concave brink are located respectively on the collet or sleeve so that they are less likely to loosen off. Such a design also enables users to easily determine whether the fastening condition has been reached. Thus, the fastening apparatus of the invention is easier to assemble and use.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A holding rack comprising a holding dock, a holding device and a fastening apparatus, the holding device having a holding bracket and a fastened member, the fastening apparatus having a collet and a sleeve, the collet being mounted onto the holding dock to hold the fastened member and being encased by the sleeve, wherein the collet has a bottom and a plurality of jutting plates secured to and extending longitudinally from the bottom in a protrusive manner, with the plurality of jutting plates having free ends opposite of and spaced from the bottom, with each jutting plate of the plurality of jutting plates having an outer surface including first and second portions, with the first portions of the outer surfaces of the plurality of jutting plates being extended outwards greater than the second portions of the outer surfaces of the plurality of jutting plates, and the sleeve has a tubular wall including a plurality of segments corresponding to the plurality of jutting plates, with each segment of the plurality of segments having an inner surface including first and second portions, with the first portions of the inner surfaces of the plurality of segments being extended inwards greater than the second portions of the inner surfaces of the plurality of segments, wherein the sleeve is rotatable about an axis relative to the collet in first and second rotating directions, with the first rotating direction being opposite of the second rotating direction, wherein the first portions of the plurality of segments are in contact with corresponding first portions of the plurality of jutting plates, with the collet having fastening and unfastening conditions, wherein the free ends bend toward the fastened member and the plurality of jutting plates are flexed inward towards the axis relative to the bottom when the collet is moved from the unfastening condition to the fastening condition, wherein the plurality of jutting plates between the free ends and the bottom conform to the fastened member relative to the bottom when the collet is moved from the unfastening condition to the fastening condition, wherein the collet is in the fastening condition when the collet is rotated in the first rotating direction, wherein the plurality of jutting plates and the bottom return to the unfastening condition when the collet is rotated in the second rotating direction, wherein the bottom engages the fastened member in both the fastening and unfastening conditions.

2. The holding rack of claim 1, wherein each jutting plate of the plurality of jutting plates has an inner surface including a first boss located on the inner surface, with each first boss protruding from the inner surface toward the axis, with each first boss pressing against the fastened member retaining the holding device in the collet when the collet is moved from the unfastening condition to the fastening condition.

3. The holding rack of claim 1, wherein the first portion on the inner surface of each segment of the plurality of segments is a sleeve boss.

4. The holding rack of claim 3, wherein each sleeve boss and each jutting plate of the plurality of plates have respectively a concave brink and a convex brink engaged with each other.

5. The holding rack of claim 1, wherein the first portion on the outer surface of each jutting plate of the plurality of jutting plates is a first boss.

6. The holding rack of claim 1, wherein the inner surfaces of the plurality of segments are in partial contact with the outer surface surfaces of the plurality of jutting plates when the first portions of the inner surfaces of the plurality of segments are located between two jutting plates of the plurality of jutting plates.

7. The holding rack of claim 1, wherein the sleeve further has at least one push member located outside the tubular wall.

8. A fastening apparatus, mounted onto an object to fasten an assembly article which has a fastened member, comprising a collet and a sleeve, the collet being mounted onto the fastened member to hold the fastened member and being encased by the sleeve, wherein
  the collet has a bottom and a plurality of jutting plates secured to and extending longitudinally from the bottom in a protrusive manner, with the plurality of jutting plates having free ends opposite of and spaced from the bottom, with each jutting plate of the plurality of jutting plates having an outer surface including first and second portions, with the first portions of the outer surfaces of the plurality of jutting plates being extended outwards greater than the second portions of the outer surfaces of the plurality of jutting plates, and
  the sleeve has a tubular wall including a plurality of segments corresponding to the plurality of jutting plates, with each segment of the plurality of segments having an inner surface including first and second portions, with the first portions of the inner surfaces of the plurality of segments being extended inwards greater than the second portions of the inner surfaces of the plurality of segments,
  wherein the sleeve is rotatable about an axis relative to the collet in first and second rotating directions, with the first rotating direction being opposite of the second rotating direction, wherein the first portions of the plurality of segments are in contact with corresponding first portions of the plurality of jutting plates, with the collet having fastening and unfastening conditions, wherein the free ends bend toward the fastened member and the plurality of jutting plates are flexed inward towards the axis relative to the bottom when the collet is moved from the unfastening condition to the fastening condition, wherein the plurality of jutting plates between the free ends and the bottom conform to the fastened member relative to the bottom when the collet is moved from the unfastening condition to the fastening condition, wherein the collet is in the fastening condition when the collet is rotated in the first rotating direction, wherein the plurality of jutting plates and the bottom return to the unfastening condition when the collet is rotated in the second rotating direction, wherein the bottom engages the fastened member in both the fastening and unfastening conditions.

9. The fastening apparatus of claim 8, wherein each of the jutting plates of the plurality of jutting plates has an inner surface which has a first boss located on the inner surface, with each first boss protruding from the inner surface toward the axis, with each first boss pressing against the fastened member retaining the holding device in the collet when the collet is moved from the unfastening condition to the fastening condition.

10. The fastening apparatus of claim 8, wherein the first portion on the inner surface of each segment of the plurality of segments is sleeve boss.

11. The fastening apparatus of claim 10, wherein each sleeve boss and each jutting plate of the plurality of jutting plates have respectively a concave brink and a convex brink engageable with each other.

12. The fastening apparatus of claim 8, wherein the first portion on the outer surface of each jutting plate of the plurality of jutting plates is a sleeve boss.

13. The fastening apparatus of claim 8, wherein the inner surfaces of the plurality of segments are in partial contact with the outer surfaces of the plurality of jutting plates when the first portions of the inner surfaces of the plurality of segments are located between two jutting plates of the plurality of plates.

14. The fastening apparatus of claim 8, wherein the sleeve further has at least one push member located outside the tubular wall.

* * * * *